United States Patent
Singh et al.

(10) Patent No.: US 9,990,564 B2
(45) Date of Patent: Jun. 5, 2018

(54) SYSTEM AND METHOD FOR OPTICAL CHARACTER RECOGNITION

(71) Applicant: Wipro Limited, Bangalore (IN)

(72) Inventors: Madhusudan Singh, Bangalore (IN); Ramprasad Kanakatte Ramanna, Bangalore (IN); Raghottam Mannopantar, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days. days.

(21) Appl. No.: 15/085,348

(22) Filed: Mar. 30, 2016

(65) Prior Publication Data

US 2017/0286803 A1    Oct. 5, 2017

(30) Foreign Application Priority Data

Mar. 29, 2016 (IN) .............................. 201641010875

(51) Int. Cl.
*G06K 9/62* (2006.01)
*G06K 9/03* (2006.01)
*G06K 9/66* (2006.01)

(52) U.S. Cl.
CPC .......... *G06K 9/6212* (2013.01); *G06K 9/033* (2013.01); *G06K 9/66* (2013.01); *G06K 2209/01* (2013.01)

(58) Field of Classification Search
CPC ........ G06K 9/6212; G06K 9/66; G06K 9/033; G06K 2209/01

(Continued)

(56) References Cited

U.S. PATENT DOCUMENTS 6,553,357 B2    8/2003  Mathias et al.
8,345,962 B2    1/2013  Yu et al.
(Continued)

FOREIGN PATENT DOCUMENTS

CN    104268627 A    1/2015

OTHER PUBLICATIONS

Abdullah Almousa Almaksour et al., "Fast Online Incremental Learning with Few Examples for Online Handwritten Character Recognition", Aug. 1, 2008, *ICFHR*, pp. 623-628.

(Continued)

*Primary Examiner* — Jerome Grant, II
(74) *Attorney, Agent, or Firm* — Finnegan, Henderson, Farabow, Garrett & Dunner LLP

(57) ABSTRACT

This disclosure relates to system and method for optical character recognition. In one embodiment, the method comprises providing an image data to a plurality of customized machine learning algorithms or various customized neural networks, configured to recognize a set of pre-defined characters. The method comprises presenting one or more suggestions for the character to the user in response to negative character recognition, and training a customized machine learning algorithm corresponding to the character if one of the suggestions is identified by the user. If the suggestions are rejected by the user, the method comprises prompting the user to identify the character and determining presence of the character in the set of pre-defined characters. The method further comprises training a customized machine learning algorithm corresponding to the character if the character is present, or dynamically creating a customized machine learning algorithm corresponding to the character if the character is not present.

17 Claims, 4 Drawing Sheets

(58) Field of Classification Search
USPC .......................................................... 382/161
See application file for complete search history.

(56) References Cited

U.S. PATENT DOCUMENTS

| | | | |
|---|---|---|---|
| 9,064,147 B2 | 6/2015 | Ouyang et al. | |
| 2004/0039563 A1* | 2/2004 | Suzuki | G06F 17/2872 704/2 |
| 2009/0281789 A1* | 11/2009 | Waibel | G06F 17/2735 704/3 |
| 2010/0145972 A1* | 6/2010 | Kipersztok | G06F 17/30737 707/759 |
| 2010/0225591 A1* | 9/2010 | Macfarlane | G06F 3/0234 345/169 |
| 2011/0307241 A1* | 12/2011 | Waibel | G10L 15/265 704/2 |
| 2014/0163953 A1* | 6/2014 | Parikh | G06F 17/276 704/9 |
| 2015/0169975 A1* | 6/2015 | Kienzle | G06K 9/34 382/189 |
| 2015/0302852 A1* | 10/2015 | Lu | G06F 3/167 704/246 |
| 2015/0331711 A1* | 11/2015 | Huang | G06F 3/0481 719/320 |
| 2015/0363001 A1* | 12/2015 | Malzbender | G06F 3/017 706/18 |
| 2015/0370891 A1* | 12/2015 | Johnson | G06F 17/30681 707/749 |
| 2016/0055146 A1* | 2/2016 | Hayase | G06F 17/2735 704/9 |
| 2017/0154620 A1* | 6/2017 | Berthelsen | G10L 15/16 |
| 2017/0168580 A1* | 6/2017 | Allen | G06F 3/017 |
| 2017/0177965 A1* | 6/2017 | Gordo Soldevila | G06K 9/325 |
| 2017/0317983 A1* | 11/2017 | Kompalli | H04L 63/0407 |

OTHER PUBLICATIONS

Achraf Ghorbel et al., "Incremental Learning for Interactive Sketch Recognition", *Graphics Recognition. New Trends and Challenges, LNCS 7423*, Springer-Verlag Berlin Heidelberg, 2013. pp. 108-118, Dec. 2013.

Michael A. Nielsen, "Deep Learning". Neural Networks and Deep Learning, retrieved from the internet: URL:http://neuralnetworksanddeeplearning.com/chap6.html, Jan. 22, 2016, pp. 1-56.

Dan C. Ciresan et al., "Transfer Learning for Latin and Chinese Characters with Deep Neural Networks", *Neural Networks (IJCNN)*, The 2012 International Joint Conference on, IEEE, Jun. 10, 2012, pp. 1-6.

Jan Kremer et al, "Active Learning with Support Vector Machines", *Wiley Interdisciplinary Reviews: Data Mining and Knowledge Discovery*, vol. 4, No. 4, Jul. 1, 2014, pp. 313-326.

Yasser Alginahi, "Preprocessing Techniques in Character Recognition", Aug. 17, 2010, In: *Character Recognition*, pp. 1-20.

European Search Report dated Dec. 9, 2016 in European Patent Office in counterpart European Patent No. Application 16180230.1. 9 pages.

Saranya Manoharan & Muthu Kumar B, "Self-Learning by Word Localization from Images", International Journal of Computer Applications, Jun. 2014, pp. 13-16, vol. 95 No. 26.

Frédéric Bastien et al., "Deep Self-Taught Learning for Handwritten Character Recognition", 2010, pp. 1-9, Dept. IRO, U. Montreal.

Isabelle Guyon et al., "Unsupervised and Transfer Learning Challenge", The 2011 International Joint Conference on Neural Networks, 2011, 8 pages.

* cited by examiner

SYSTEM AND METHOD FOR OPTICAL CHARACTER RECOGNITION

TECHNICAL FIELD

This disclosure relates generally to optical character recognition, and more particularly to system and method for dynamic and customizable optical character recognition.

BACKGROUND

Extracting data (e.g., text, numbers, symbols, etc.) from images (e.g., filled forms, drawings, digital documents, etc.) and building meaningful information from the extracted data is a complex and time consuming task as a number of different text, numbers, and symbols are essentially required to be identified and correlated. Typically, such data extraction and information building is done manually and is prone to human errors. More recently, computer based system have been employed to automatically extract data and build meaningful information from digital images. Many of such systems employ optical character recognition (OCR) techniques for extraction of data from the digital images.

Existing OCR techniques have been built on pre-defined symbols, numbers, and text on which they have been trained. However, as the digital images and the training data (text, number, symbols, etc.) available in the digital images are very limited, training a machine learning algorithm for OCR to identify the data with high level of accuracy is challenging. Further, once an OCR technique has been trained for or has learnt a set of symbols (e.g., in a specific domain), it is difficult to apply it to new set of images which may be similar to the previous set but yet may have many new symbols that the OCR technique may not recognize. Additionally, there are many situations when the data in the digital images may vary due to multiple factors. For example, data available in the digital images are highly inconsistent and depends on various factors such as image resolution, noise effect, font size, and type variation, and so forth. Moreover, in the digital images, the information is split into the various places and needs to be associated correctly.

Existing OCR techniques are therefore not able to perform with the good accuracy on the multiple digital images. Further, pre-defined OCR techniques are not only ineffective but also may be erroneous. It is therefore desirable to provide an effective technique to extract and identify the various different symbols, numbers, and texts in the digital images and to correlate them so as to build the appropriate and complete meaningful information.

SUMMARY

In one embodiment, a method for optical character recognition is disclosed. In one example, the method comprises detecting a presence of a character in an image data. The method further comprises providing the image data to a plurality of customized machine learning algorithms for character recognition. Each of the plurality of customized machine learning algorithms is configured to recognize a pre-defined character. In response to a negative character recognition, the method further comprises presenting one or more suggestions for the character to the user. In response to one of the one or more suggestions being identified by the user, the method further comprises training a customized machine learning algorithm corresponding to the character. In response to the one or more suggestions being rejected by the user, the method further comprises prompting the user to identify the character, and determining a presence of the character in a set of pre-defined characters. In response to a positive presence, the method further comprises training a customized machine learning algorithm corresponding to the character. In response to a negative presence, the method further comprises adding the character in the set of pre-defined characters, and dynamically creating a customized machine learning algorithm corresponding to the character.

In one embodiment, a system for optical character recognition is disclosed. In one example, the system comprises at least one processor and a memory communicatively coupled to the at least one processor. The memory stores processor-executable instructions, which, on execution, cause the processor to detect a presence of a character in an image data. The processor-executable instructions, on execution, further cause the processor to provide the image data to a plurality of customized machine learning algorithms for character recognition. Each of the plurality of customized machine learning algorithms is configured to recognize a pre-defined character. In response to a negative character recognition, the processor-executable instructions, on execution, further cause the processor to present one or more suggestions for the character to the user. In response to one of the one or more suggestions being identified by the user, the processor-executable instructions, on execution, further cause the processor to train a customized machine learning algorithm corresponding to the character. In response to the one or more suggestions being rejected by the user, the processor-executable instructions, on execution, further cause the processor to prompt the user to identify the character, and to determine a presence of the character in a set of pre-defined characters. In response to a positive presence, the processor-executable instructions, on execution, further cause the processor to train a customized machine learning algorithm corresponding to the character. In response to a negative presence, the processor-executable instructions, on execution, further cause the processor to add the character in the set of pre-defined characters, and to dynamically create a customized machine learning algorithm corresponding to the character.

In one embodiment, a non-transitory computer-readable medium storing computer-executable instructions for optical character recognition is disclosed. In one example, the stored instructions, when executed by a processor, cause the processor to perform operations comprising detecting a presence of a character in an image data. The operations further comprise providing the image data to a plurality of customized machine learning algorithms for character recognition. Each of the plurality of customized machine learning algorithms is configured to recognize a pre-defined character. In response to a negative character recognition, the operations further comprise presenting one or more suggestions for the character to the user. In response to one of the one or more suggestions being identified by the user, the operations further comprise training a customized machine learning algorithm corresponding to the character. In response to the one or more suggestions being rejected by the user, the operations further comprise prompting the user to identify the character, and determining a presence of the character in a set of pre-defined characters. In response to a positive presence, the operations further comprise training a customized machine learning algorithm corresponding to the character. In response to a negative presence, the operations further comprise adding the character in the set of pre-defined characters, and dynamically creating a customized machine learning algorithm corresponding to the character.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
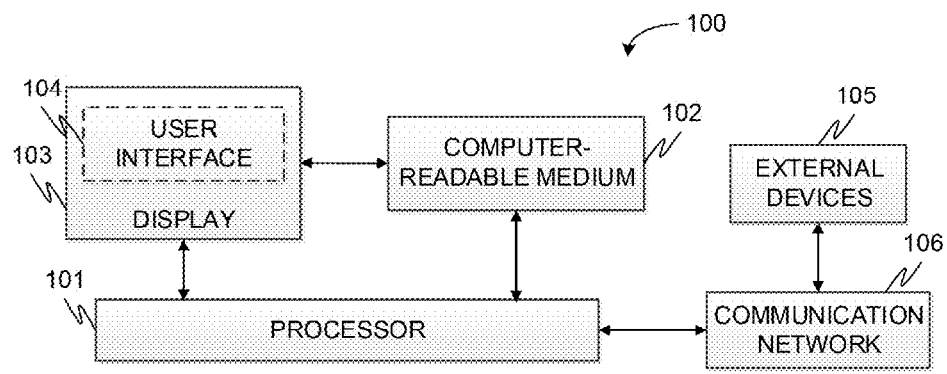
FIG. 1 is a block diagram of an exemplary system for optical character recognition (OCR) in accordance with some embodiments of the present disclosure.

Referring now to FIG. 1, an exemplary system 100 for optical character recognition (OCR) is illustrated in accordance with some embodiments of the present disclosure. In particular, the system 100 includes a character recognition device (e.g., laptop, netbook, or any other computing device) that implements an OCR engine 200 for performing dynamic and customizable OCR. As will be described in greater detail in conjunction with FIG. 2, the OCR engine 200 comprises multiple customized machine learning algorithms such that each of the customized machine learning algorithms is configured to recognize a pre-defined character. The OCR engine 200 detects a presence of a character in an image data, and provides the image data to the multiple customized machine learning algorithms for character recognition. In response to a negative character recognition, the OCR engine 200 presents one or more suggestions for the character to the user and trains a customized machine learning algorithm corresponding to the character if one of the suggestions is identified by the user to represent the character. However, if all the suggestions are rejected by the user, the OCR engine 200 prompts the user to identify the character, and determines presence of the character in the set of pre-defined characters. The OCR engine 200 then trains a customized machine learning algorithm corresponding to the character if the character is present, or alternatively dynamically creates a customized machine learning algorithm corresponding to the character if the character is not present.

The system 100 comprises one or more processors 101, a computer-readable medium (e.g., a memory) 102, and a display 103. The computer-readable storage medium 102 stores instructions that, when executed by the one or more processors 101, cause the one or more processors 101 to perform OCR in accordance with aspects of the present disclosure. The computer-readable storage medium 102 may also store various data (e.g., image, image data, a pre-defined set of characters, machine learning algorithms, weights for each of the algorithms, generated text, output of machine learning algorithms, suggested characters, new characters labelled by the user, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
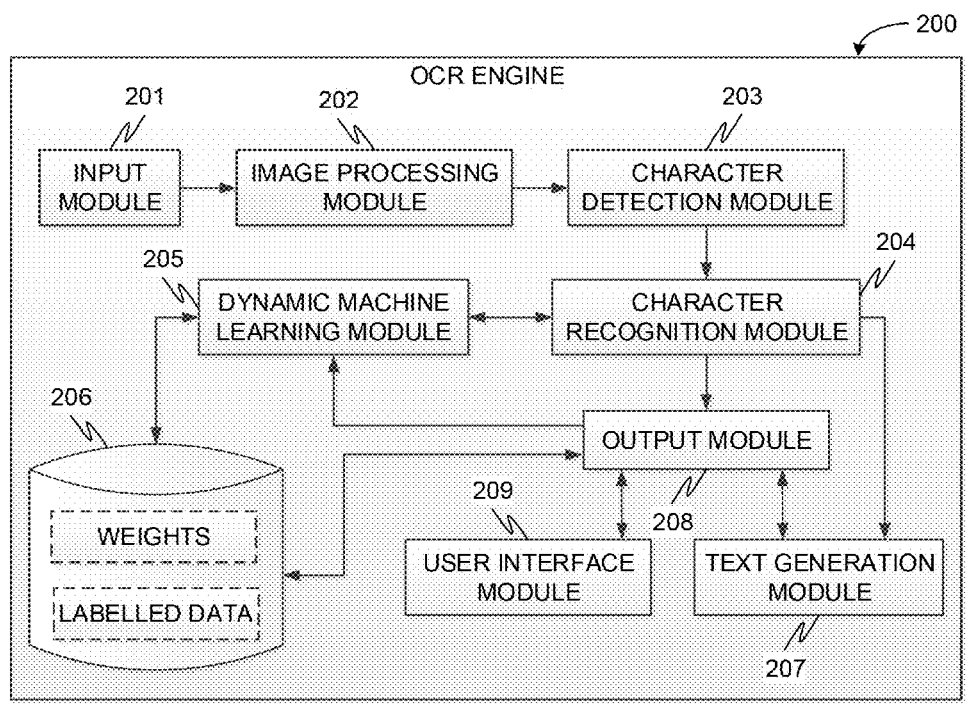
FIG. 2 is a functional block diagram of an optical character recognition engine in accordance with some embodiments of the present disclosure.

Referring now to FIG. 2, a functional block diagram of the OCR engine 200 implemented by the system 100 of FIG. 1 is illustrated in accordance with some embodiments of the present disclosure. The OCR engine 200 may include various modules that perform various functions so as to perform OCR. In some embodiments, the OCR engine 200 comprises an input module 201, an image processing module 202, a character detection module 203, a character recognition module 204, a dynamic machine learning module 205, a database 206, an output module 207, a user interface module 208, and a text generation module 209.

As will be appreciated by those skilled in the art, the input module 201 receives an image from a user, an application (e.g., Adobe Acrobat, MS Paint, Image viewer, etc.) or another device (e.g., scanner, fax machine, etc.). In some embodiments, the input module receives a two-dimensional (2D) images from which the data has to be extracted. The image processing module 202 receives the image from the input module 201 and processes the received image to generate image data for subsequent processing. In some embodiments, the image processing module 202 performs image pre-processing by applying standard signal-processing techniques to the received image. In some embodiments, the pre-processing may include, but is not limited to, filtering noise from the image, correcting orientation of the image, correction distortion in the image, resizing the image, performing grey-scale conversion, performing image enhancement, and so forth. The image data may then be generated from the processed image for subsequent processing. The character detection module 203 receives image data from the image processing module 202 and detects a presence of a character in the image data. It should be noted that the character may include, but not limited to, any character, number, special character, or symbol. Further, it should be noted that the character detection module 203 does not identify the character.

The character recognition module 204 provides the capability to identify or recognize the individual characters using multiple machine learning algorithms. It should be noted that each of the customized machine learning algorithms is configured to recognize a pre-defined character. The character recognition module 204 calls (i.e., bring in operation) the multiple machine learning algorithms via the dynamic machine learning module 205. Thus, the character recognition module 204 receives the image data comprising of a character to be recognized from the character detection module 203 and provides the image data to the multiple customized machine learning algorithms for character recognition. The character recognition module 204 then processes the image data via each of the multiple customized machine learning algorithms to generate a corresponding output. The character recognition module 204 then applies one or more pre-defined threshold criteria for recognition to the generated output of each of the multiple customized machine learning algorithms so as to identify or recognize the character in the image data. As will be appreciated by those skilled in the art, the character recognition module 204 positively recognizes the character in the image data as the character corresponding to one of the multiple customized machine learning algorithms for which the generated output meets pre-defined threshold criteria for recognition. However, the character recognition module 204 fails to recognize the character in the image data if the generated output of each of the multiple customized machine learning algorithms fails to meets the pre-defined threshold criteria for recognition. Further, in case of non-recognition of character from the image data, the character recognition module 204 may provide one or more suggestions for the character. In some embodiments, the one or more suggestions may include characters corresponding to one or more of the multiple customized machine learning algorithms whose outputs meet pre-defined threshold criteria for suggestion but does not meet the pre-defined threshold criteria for recognition.

The dynamic machine learning module 205 initializes, builds, and trains various customized machine learning algorithms such that each machine learning algorithm is configured to recognize a unique individual character from a set of pre-defined characters. In an example the various customized machine learning algorithms may also be various customized neural networks. The various customized neural networks may be a trained machine learning algorithms, trained to recognize at least one character, in response to an external input. The customized machine learning algorithms may employ deep learning mechanism and transfer learning mechanism to learn new characters and/or to further train on the characters. As will be appreciated by those skilled in the art, these mechanisms enable the machine learning algorithm to learn new variations or new characters more quickly and accurately by exploiting past experience. The machine learning algorithm trained on one character may learn new related character or new variation more quickly and accurately. For example, transfer learning mechanism may be employed to train the customized machine learning algorithm on the similar type of the image data in which the available dataset is less noisy or corrupt. Similarly, deep learning mechanism may be employed to create (i.e., initialize and train) a new customized machine learning algorithm corresponding to a new character. In some embodiments, the machine learning algorithm is based on multi-layer feed-forward neural network (MLFFNN) model. In some embodiments, the parameters (e.g., weights, etc.) of the customized machine learning algorithms are initialized by unsupervised pre-training methodology.

Further, the dynamic machine learning module 205 updates the database 206 with the set of pre-defined characters having a corresponding machine learning algorithm. In particular, the dynamic machine learning module 205 updates the database 206 with characters, unique identifiers (e.g., unique numbers, generated output, etc.) corresponding to the characters, parameters (e.g., weights) of corresponding machine learning algorithms, and so forth. Thus, the engine and various modules may extract characters from the unique identifiers and unique identifies from character. In some embodiments, the dynamic machine learning module 205 in conjunction with the database 206 may return unique identifiers for the identified characters.

The text generation module 207 collects all recognized or otherwise identified characters for subsequent processing so as to generate meaningful information (e.g., text). In some embodiments, the text generation module 207 receives the positively recognized character from the character recognition module 204. Further, in some embodiments, the text generation module 207 receives the character identified by the user through the output module 208 for the character that the character recognition module 204 fails to recognize. In some embodiments, the text generation module 207 may generate meaningful information by employing one or more rules, general or domain specific knowledge base (e.g., dictionary), and so forth. For example, the text generation module 207 may refer to an English language dictionary while formulating English language text. As will be appreciated by those skilled in the art, the rules or knowledge base may reside within the database 206.

The output module 208 in conjunction with the user interface module 209 presents the characters recognized or suggested by the character recognition module 204 to the user. The output module 208 in conjunction with the user interface module 209 may also present the text generated by the text generation module 207 to the user. In other words, the output module 208 in conjunction with the user interface module 209 presents recognized character to the user for the character that is positively recognized, presents suggested characters to the user for identifying character that is not recognized, presents text to the user once formulated from the recognized and/or identified characters.

The output module 208 in conjunction with the user interface module 209 also prompts the user to pick one of the suggested characters as one correctly corresponding to the character in the image data. Alternatively, the user may be prompted to label the character in the image data with a new character if none of the suggested characters correctly correspond to the character in the image data. The output module 208 in conjunction with the user interface module 209 receives the user input (e.g., one of the suggested characters or a new labelled character) and provides the same to the text generation module 207 for generating meaningful information. Additionally, the output module 208 provides the received user input to the dynamic machine learning module 205 for re-training existing machine learning algorithm corresponding to the suggested character picked by the user or for dynamically creating new machine learning algorithm corresponding to the new character labelled by the user. The output module 208 may also update the set of pre-defined characters in the database 206 by adding the new labelled character to the set. In some embodiments, the output module 208 may refer to the database 206 to determine if the new character labelled by the user is present in the set of pre-defined characters or not. If the labelled character is already present, the output module 208 in conjunction with the dynamic machine learning module 205 re-trains existing machine learning algorithm corresponding to the labelled character.

As will be appreciated by those skilled in the art, all such aforementioned modules 201-209 may be represented as a single module or a combination of different modules. Further, as will be appreciated by those skilled in the art, each of the modules 201-209 may reside, in whole or in parts, on one device or multiple devices in communication with each other.

By way of an example, the OCR engine 200 receives an image with written text and processes the same to filter noise and correct orientation. The processed image is then analyzed to detect the presence of the text or individual characters. The image data comprising of individual character is then provided to all available neural networks. It should be noted that there is one neural network corresponding to each character in the pre-defined set of characters. The image data is processed by each of the available neural networks and the output of that neural network is taken into account whose output is high. Each individual neural network is trained to output "1" for correct character and "0" for rest. Hence, during the testing/identification phase, the provided character image data should be recognized by the neural network whose output is high and above a pre-defined threshold for recognition. If the output of the neural network whose output is maximum is below the recognition threshold, then new character has been identified for which there is no corresponding neural network or the existing neural networks are insufficiently trained to handle the provided variation. In this case, user has to manually identify the character from a set of suggested character or label the character. Based on the received input, an existing neural network may be re-trained or a new neural network may be created. In an example, a neural network may be a trained machine learning algorithm, trained to recognize at least one character, in response to an external input.

In one example, two Neural Networks (NN) are already existing (e.g., for characters 'A' and 'B'). If the OCR engine 200 is trained for a character, the engine 200 outputs the results correctly only for that character. Even though different font or different size of known character is given as input, the engine 200 identifies and does not need more training. In this example, if the input character is 'A', then system identifies this as 'A'. However, if the input character is 'A' but the engine 200 identifies this as 'B', then more training is required for 'A' as the engine 200 is outputting wrong results. Further, if the engine 200 is not trained for a character, the engine 200 cannot identify that character. Thus, if the input character is 'C', but engine 200 identifies this as 'B' or cannot identify at all, then user has to label this new character as 'C', store the new character in the database, and create a new network corresponding to 'C'. Every time new character arrives, new neural network will be created.

If the engine now has three characters trained, there will be three NN. When 'A', 'B' and 'C' characters are passed as input, the output of each NN will have values as provided in the input-output table A below:

TABLE A

| Input | Output of NN-A | Output of NN-B | Output of NN-C |
|---|---|---|---|
| A | 1 | 0 | 0 |
| B | 0 | 1 | 0 |
| C | 0 | 0 | 1 |

The input-output table may be employed to store all the trained data and NN output values for each character. Now, when the engine 200 again encounters new character 'G' and is trained with the character 'G', then New NN for 'G' is created and the updated input-output table will be as provided in the input-output table B below:

TABLE B

| Input | Output of NN-A | Output of NN-B | Output of NN-C | Output of NN-G |
|---|---|---|---|---|
| A | 1 | 0 | 0 | 0 |
| B | 0 | 1 | 0 | 0 |
| C | 0 | 0 | 1 | 0 |
| G | 0 | 0 | 0 | 1 |

As will be appreciated by one skilled in the art, a variety of processes may be employed for performing optical character recognition. For example, the exemplary system 100 may perform optical character recognition by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
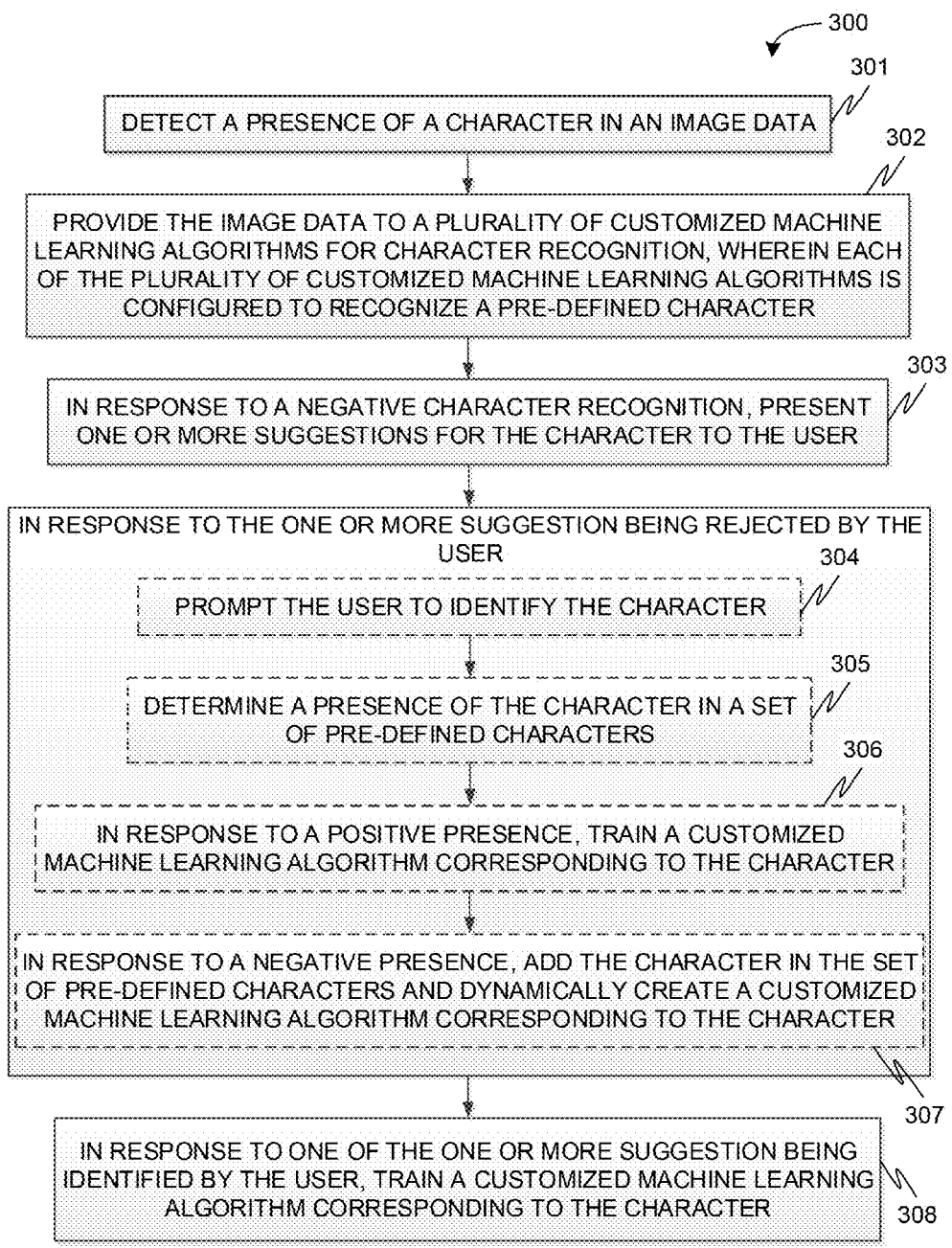
FIG. 3 is a flow diagram of an exemplary process for optical character recognition in accordance with some embodiments of the present disclosure.

For example, referring now to FIG. 3, exemplary control logic 300 for optical character recognition via a system, such as system 100, is depicted via a flowchart in accordance with some embodiments of the present disclosure. As illustrated in the flowchart, the control logic 300 includes the steps of detecting a presence of a character in an image data at step 301, and providing the image data to a plurality of customized machine learning algorithms for character recognition at step 302. Each of the plurality of customized machine learning algorithms is configured to recognize a pre-defined character. In response to a negative character recognition, the control logic 300 includes the step of presenting one or more suggestions for the character to the user at step 303. In response to the one or more suggestions being rejected by the user, the control logic 300 includes the steps of prompting the user to identify the character at step 304, and determining a presence of the character in a set of pre-defined characters at step 305. In response to a positive presence, the control logic 300 includes the step of training a customized machine learning algorithm corresponding to the character at step 306. Alternatively, in response to a negative presence, the control logic 300 includes the steps of adding the character in the set of pre-defined characters, and dynamically creating a customized machine learning algorithm corresponding to the character at step 307. Further, in response to one of the one or more suggestions being identified by the user, the control logic 300 includes the steps of training a customized machine learning algorithm corresponding to the character at step 308.

In some embodiments, the control logic 300 further includes the steps of receiving an image from the user, pre-processing the image to correct an orientation of the image or to filter noise from the image, and processing the image to generate the image data. Additionally, in some embodiments, the control logic 300 includes the step of gathering the recognized or identified characters for subsequent processing to generate a text.

In some embodiments, each of the plurality of customized machine learning algorithms is a multi-layer feed-forward neural network. In some embodiments, character recognition further comprises applying a pre-defined threshold criteria for recognition to output of each of the plurality of customized machine learning algorithms, and selecting the character corresponding to one of the plurality of customized machine learning algorithms whose output meets the pre-defined threshold criteria for recognition. Further, in some embodiments, dynamically creating the customized machine learning algorithm corresponding to the character comprises learning the character by deep learning mechanism. Similarly, in some embodiments, training the customized machine learning algorithm corresponding to the character comprises learning the character by transfer learning mechanism. Moreover, in some embodiments, the one or more suggestions comprises characters corresponding to one or more of the plurality of customized machine learning algorithms whose outputs meet a pre-defined threshold criteria for suggestion but does not meet a pre-defined threshold criteria for recognition.

Figure 4:
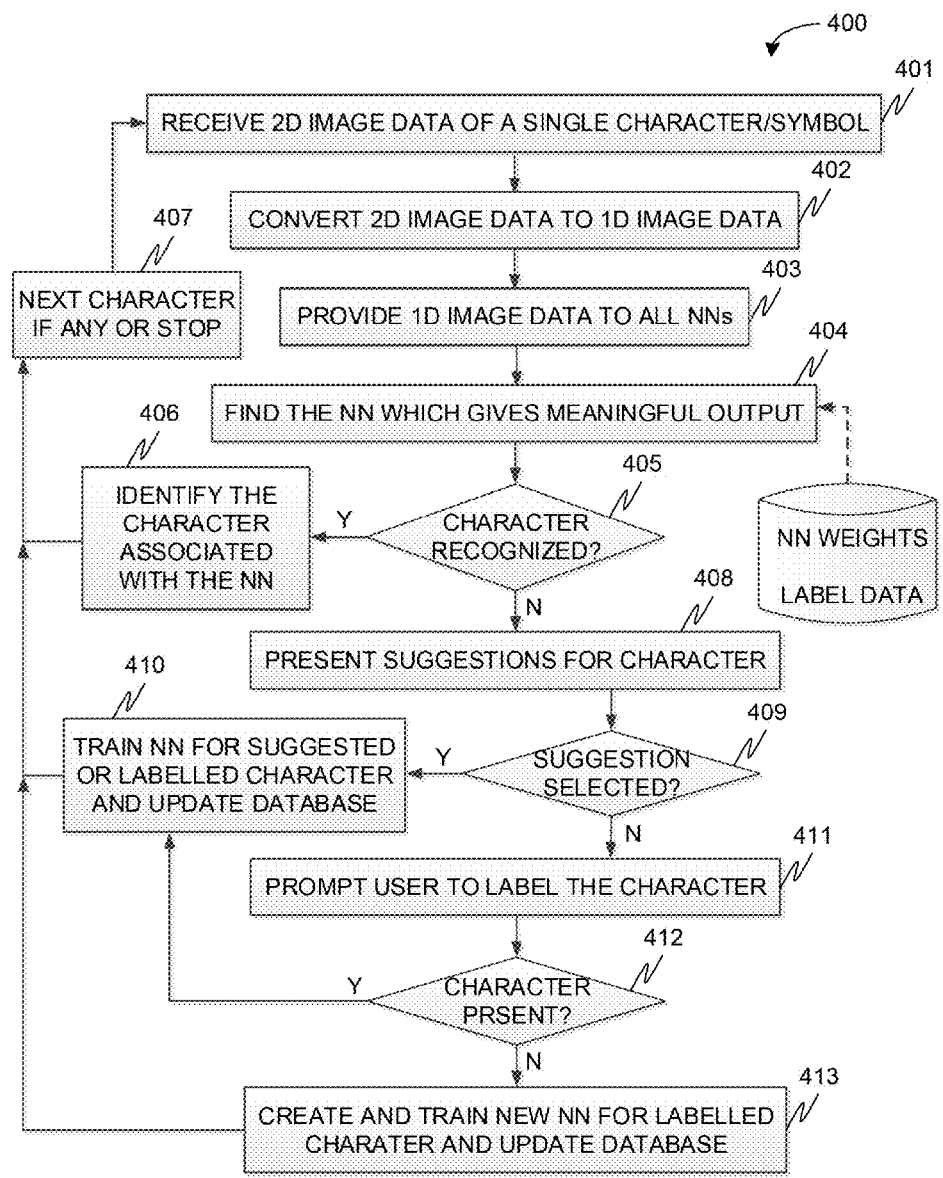
FIG. 4 is a flow diagram of a detailed exemplary process for optical character recognition in accordance with some embodiments of the present disclosure.

Referring now to FIG. 4, exemplary control logic 400 for optical character recognition is depicted in greater detail via a flowchart in accordance with some embodiments of the present disclosure. As illustrated in the flowchart, the control logic 400 starts upon accepting the input image, pre-processing the input image, detecting characters to be recognized, and generating two-dimensional (2D) image data of each character to be recognized. The control logic 400 includes the steps of receiving two-dimensional image data of an individual character or symbol at step 401, converting the two-dimensional image data to one-dimensional (1D) image data at step 402, providing the one-dimensional image data to all neural networks (NNs) at step 403, and finding the neural network which gives meaningful output at step 404. It should be noted that the control logic 400 may refer to a database comprising of the labelled characters and NN parameters to perform step 404. The control logic 400 further includes the step of determining if the character is recognized or not at step 405. As noted above, the determination at step 405 is performed by applying pre-defined threshold criteria for recognition. The character is recognized if the output of the neural network meets the pre-defined threshold criteria for recognition else the character is not recognized. If the character is recognized, the control logic 400 further includes the steps of identifying the character associated with the neural network at step 406, and moving on to next character or to text formation at step 407.

However, if the character is not recognized, the control logic 400 includes the step of presenting one or more suggested characters for the character in the image data at step 408. As noted above, the one or more suggested characters are determined at step 408 by applying pre-defined threshold criteria for suggestion. The characters are suggested if the output of the corresponding neural networks meets the pre-defined threshold criteria for suggestion but does not meet pre-defined threshold criteria for recognition. The control logic 400 further includes the step of determining if one of the suggested characters is selected by the user or not at step 409. If one of the suggested characters is selected, the control logic 400 includes the step of training the neural network corresponding to the suggested character and updating the database with new parameters for the trained neural network at step 410 so that the variation encountered in the image data is correctly recognized in subsequent runs. The control logic 400 then moves on to the next character or forms the text based on the recognized and identified characters at step 407.

However, if none of the suggested characters are selected by the user as representing the character in the image data, then the control logic 400 includes the steps of prompting the user to label the character in the image data at step 411, and determining if the labelled character is present in the set of pre-defined characters for which the corresponding neural networks are existing at step 412. If the character is present in the database, the control logic 400 includes the step of training the neural network corresponding to the labelled character and updating the database with new parameters for the trained neural network at step 410 so that the variation encountered in the image data is correctly recognized in subsequent runs. However, if the character is not present in the database, the control logic 400 includes the step of dynamically creating a new neural network corresponding to the new character and updating the database with the new character and parameters for the new neural network at step 413. It should be noted that creating the new neural network comprises initializing and training the new neural network. Further, it should be noted that the control logic 400 may employ deep learning mechanism and transfer learning mechanism to create neural networks for new characters and/or to train neural networks for existing characters.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
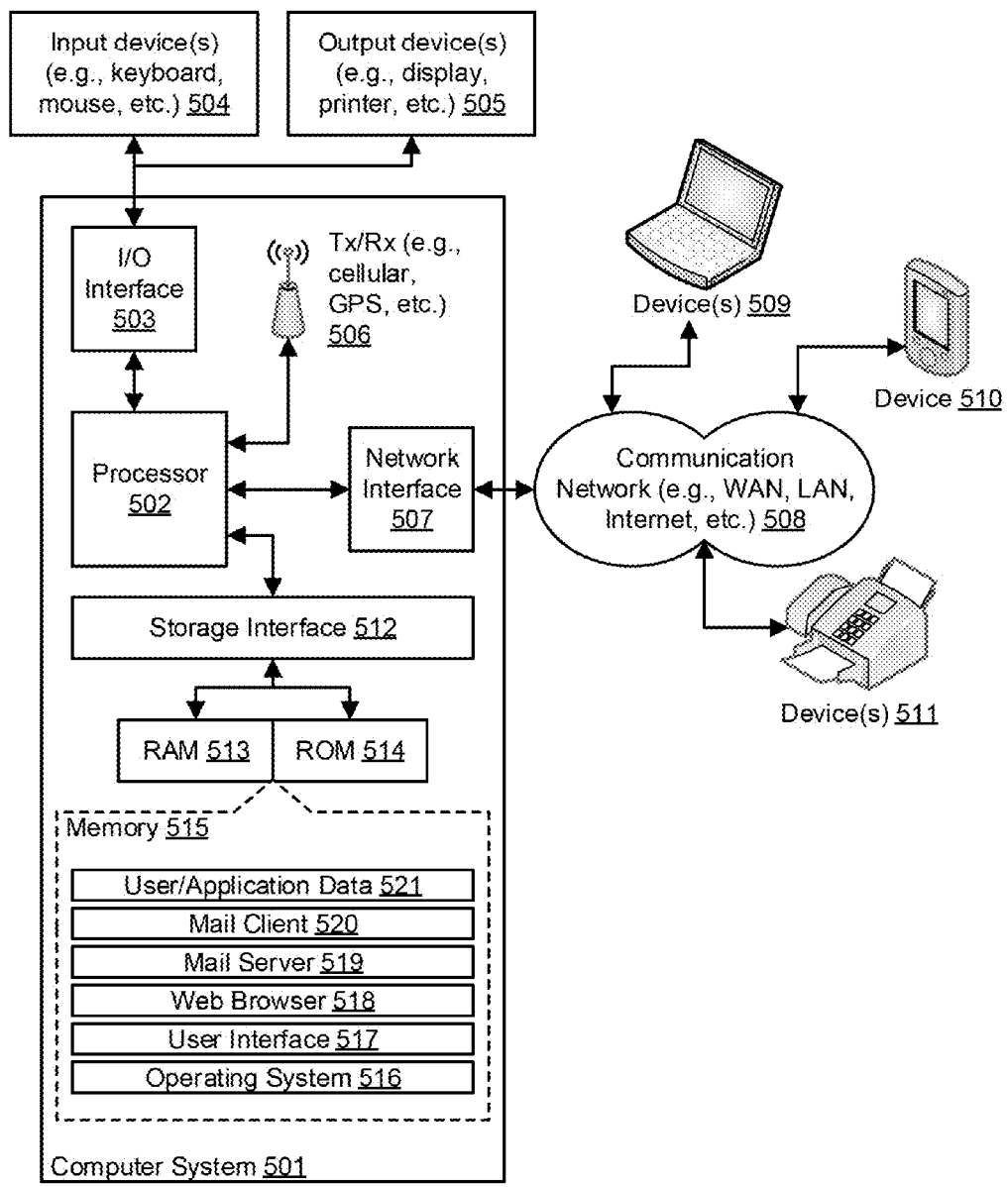
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for optical character recognition. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., image, image data, a pre-defined set of characters, machine learning algorithms, parameters for each of the algorithms, generated text, output of algorithms, suggested characters, new characters labelled by the user, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for customizable optical character recognition (OCR) using individual machine learning algorithm (e.g., neural network) for each character. Further, as will be appreciated by those skilled in the art, the techniques described in the various embodiments discussed above are configured to dynamically learn new characters as well as dynamically adapt itself for different datasets through deep learning and transfer learning mechanisms, thereby ensuring correct recognition of a large number of different characters as well as a large number of variations for each character. Thus, the techniques once trained to perform OCR on some type of datasets may be easily trained and put to use on similar other type of datasets even when the other type of datasets have insufficient training data, noisy data, or corrupt data. Further, dynamic building and training of machine learning algorithms based on deep learning and transfer learning mechanisms ensures that the techniques, described in the embodiments discussed above, are accurate and robust for a large number of different characters as well as a large number of variations for each character.

In some embodiments, the techniques for performing the customized OCR is based on multi-layer feed-forward neural networks (MLFFNNs) as the machine learning algorithms. A MLFNN is created and trained for each character based on deep learning and transfer learning mechanisms. Further, a new MLFFNN may be dynamically created for each new character encountered. Thus, if the techniques encounter a new character then it determines most probable (e.g., top 3) MLFFNNs output values as suggested options and prompts the user to select the correct one from the suggested options. If the suggested options do not contain the new character, user will label the character and save it in the database, thereby indicating that the techniques need to learn the new character. However, if the suggested options do contain the new character, user will select the correct character, thereby indicating that the techniques need to train the MLFNN corresponding to the selected character so as to correctly recognize the variation.

The specification has described system and method for optical character recognition. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optical character recognition, the method comprising:
   detecting, by a character recognition device, a presence of a character in an image data;
   providing, by the character recognition device, the image data to a plurality of customized machine learning algorithms for character recognition, wherein each of the plurality of customized machine learning algorithms is configured to recognize a pre-defined character;
   in response to a negative character recognition, presenting, by the character recognition device, one or more suggestions for the character to the user, wherein the one or more suggestions comprises characters corresponding to one or more of the plurality of customized machine learning algorithms whose outputs meet a pre-defined threshold criteria for suggestion but does not meet a pre-defined threshold criteria for recognition;
   in response to the one or more suggestions being rejected by the user,
      prompting, by the character recognition device, the user to identify the character;
      determining, by the character recognition device, a presence of the character in a set of pre-defined characters;
      in response to a positive presence, training, by the character recognition device, a customized machine learning algorithm corresponding to the character; and
      in response to a negative presence, adding, by the character recognition device, the character in the set of pre-defined characters, and dynamically creating, by the character recognition device, a customized machine learning algorithm corresponding to the character; and
   in response to one of the one or more suggestions being identified by the user, training, by the character recognition device, a customized machine learning algorithm corresponding to the character.

2. The method of claim 1, further comprising:
   receiving an image;
   pre-processing the image to correct an orientation of the image or to filter noise from the image; and
   processing the image to generate the image data.

3. The method of claim 1, wherein each of the plurality of customized machine learning algorithms is a multi-layer feed-forward neural network.

4. The method of claim 1, wherein character recognition comprises:
applying a pre-defined threshold criteria for recognition to output of each of the plurality of customized machine learning algorithms; and
selecting the character corresponding to one of the plurality of customized machine learning algorithms whose output meets the pre-defined threshold criteria for recognition.

5. The method of claim 1, further comprising gathering the recognized or identified characters for subsequent processing to generate a text.

6. The method of claim 1, wherein dynamically creating the customized machine learning algorithm corresponding to the character comprises learning the character by deep learning mechanism.

7. The method of claim 1, wherein training the customized machine learning algorithm corresponding to the character comprises learning the character by transfer learning mechanism.

8. A system for optical character recognition, the system comprising:
at least one processor; and
a non-transitory computer-readable medium storing instructions that, when executed by the at least one processor, cause the at least one processor to perform operations comprising:
detecting a presence of a character in an image data;
providing the image data to a plurality of customized machine learning algorithms for character recognition, wherein each of the plurality of customized machine learning algorithms is configured to recognize a pre-defined character;
in response to a negative character recognition, presenting one or more suggestions for the character to the user, wherein the one or more suggestions comprises characters corresponding to one or more of the plurality of customized machine learning algorithms whose outputs meet a pre-defined threshold criteria for suggestion but does not meet a pre-defined threshold criteria for recognition;
in response to the one or more suggestions being rejected by the user,
prompting the user to identify the character;
determining a presence of the character in a set of pre-defined characters;
in response to a positive presence, training a customized machine learning algorithm corresponding to the character; and
in response to a negative presence, adding the character in the set of pre-defined characters and dynamically creating a customized machine learning algorithm corresponding to the character; and
in response to one of the one or more suggestions being identified by the user, training a customized machine learning algorithm corresponding to the character.

9. The system of claim 8, wherein the operations further comprise:
receiving an image;
pre-processing the image to correct an orientation of the image or to filter noise from the image; and
processing the image to generate the image data.

10. The system of claim 8, wherein each of the plurality of customized machine learning algorithms is a multi-layer feed-forward neural network.

11. The system of claim 8, wherein character recognition comprises:
applying a pre-defined threshold criteria for recognition to output of each of the plurality of customized machine learning algorithms; and
selecting the character corresponding to one of the plurality of customized machine learning algorithms whose output meets the pre-defined threshold criteria for recognition.

12. The system of claim 8, wherein the operations further comprise gathering the recognized or identified characters for subsequent processing to generate a text.

13. The system of claim 8, wherein dynamically creating the customized machine learning algorithm corresponding to the character comprises learning the character by deep learning mechanism.

14. The system of claim 8, wherein training the customized machine learning algorithm corresponding to the character comprises learning the character by transfer learning mechanism.

15. A non-transitory computer-readable storage medium having stored thereon, a set of computer-executable instructions for causing a computer comprising one or more processors to perform steps comprising:
detecting a presence of a character in an image data;
providing the image data to a plurality of customized machine learning algorithms for character recognition, wherein each of the plurality of customized machine learning algorithms is configured to recognize a pre-defined character;
in response to a negative character recognition, presenting one or more suggestions for the character to the user, wherein the one or more suggestions comprises characters corresponding to one or more of the plurality of customized machine learning algorithms whose outputs meet a pre-defined threshold criteria for suggestion but does not meet a pre-defined threshold criteria for recognition;
in response to the one or more suggestions being rejected by the user,
prompting the user to identify the character;
determining a presence of the character in a set of pre-defined characters;
in response to a positive presence, training a customized machine learning algorithm corresponding to the character; and
in response to a negative presence, adding the character in the set of pre-defined characters and dynamically creating a customized machine learning algorithm corresponding to the character; and
in response to one of the one or more suggestions being identified by the user, training a customized machine learning algorithm corresponding to the character.

16. The non-transitory computer-readable medium of claim 15, further storing computer-executable instructions for:
receiving an image;
pre-processing the image to correct an orientation of the image or to filter noise from the image; and
processing the image to generate the image data.

17. The non-transitory computer-readable medium of claim 15, wherein character recognition comprises:
applying a pre-defined threshold criteria for recognition to output of each of the plurality of customized machine learning algorithms; and
selecting the character corresponding to one of the plurality of customized machine learning algorithms whose output meets the pre-defined threshold criteria for recognition.

* * * * *